United States Patent
Moe

(10) Patent No.: US 8,621,747 B2
(45) Date of Patent: *Jan. 7, 2014

(54) METHOD OF MAKING A COAXIAL CABLE INCLUDING TUBULAR BIMETALLIC INNER LAYER WITH FOLDED OVER EDGE PORTIONS

(75) Inventor: Alan N. Moe, Hickory, NC (US)

(73) Assignee: Andrew LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/596,610

(22) Filed: Aug. 28, 2012

(65) Prior Publication Data

US 2012/0317800 A1    Dec. 20, 2012

Related U.S. Application Data

(63) Continuation of application No. 12/394,941, filed on Feb. 27, 2009, now Pat. No. 8,302,294, which is a continuation-in-part of application No. 11/957,063, filed on Dec. 14, 2007, now Pat. No. 7,569,767.

(51) Int. Cl.
*H01B 13/20* (2006.01)
*H01B 13/016* (2006.01)

(52) U.S. Cl.
USPC .................................. 29/828; 29/825; 29/846

(58) Field of Classification Search
USPC .................. 29/828, 825, 827, 846, 847, 850; 156/923, DIG. 6; 174/106 R, 126.1, 174/125.1, 126.2, 105 R, 108
See application file for complete search history.

(56) References Cited

U.S. PATENT DOCUMENTS

| | | | |
|---|---|---|---|
| 3,940,049 A | | 2/1976 | Richter et al. |
| 4,117,260 A | * | 9/1978 | Wilkenloh ............... 174/106 R |
| 6,137,058 A | * | 10/2000 | Moe et al. ................ 174/102 R |
| 6,342,677 B1 | * | 1/2002 | Lee ........................... 174/106 R |
| 6,384,337 B1 | * | 5/2002 | Drum ........................ 174/102 R |
| 6,417,454 B1 | * | 7/2002 | Biebuyck .................. 174/106 R |
| 6,717,493 B2 | * | 4/2004 | Chopra et al. ................ 333/237 |
| 6,915,564 B2 | | 7/2005 | Adams |
| 7,569,766 B2 | * | 8/2009 | Moe et al. ........................ 174/28 |
| 7,622,678 B2 | * | 11/2009 | Moe et al. ................ 174/102 R |
| 7,687,719 B2 | * | 3/2010 | Moe et al. ................. 174/106 R |
| 2002/0053446 A1 | | 5/2002 | Moe et al. |
| 2004/0118591 A1 | * | 6/2004 | Bufanda et al. ........... 174/106 R |
| 2006/0011376 A1 | * | 1/2006 | Van Den Berg et al. .. 174/120 R |

FOREIGN PATENT DOCUMENTS

EP    1469486    10/2004

* cited by examiner

*Primary Examiner* — Peter DungBa Vo
*Assistant Examiner* — Kaying Kue
(74) *Attorney, Agent, or Firm* — Allen, Dyer, Doppelt, Milbrath & Gilchrist, P.A.

(57) ABSTRACT

A method for making a coaxial cable including an inner conductor, an outer conductor, and a dielectric material layer therebetween may include forming the inner conductor by at least forming a bimetallic strip into a tubular bimetallic layer having a pair of longitudinal edge portions at a longitudinal seam. The bimetallic strip may include an inner metal layer and an outer metal layer bonded thereto and coextensive therewith. Each of the longitudinal edge portions may be folded over. The method may also include forming a welded joint between adjacent portions of the folded over longitudinal edge portions and defining surplus material at the welded joint. The method may further include removing the surplus material at the welded joint and forming the dielectric material layer surrounding the inner conductor. The method may also include forming the outer conductor surrounding the dielectric material layer.

23 Claims, 10 Drawing Sheets

METHOD OF MAKING A COAXIAL CABLE INCLUDING TUBULAR BIMETALLIC INNER LAYER WITH FOLDED OVER EDGE PORTIONS

RELATED APPLICATIONS

The present application is a continuation of pending Ser. No. 12/394,941 filed Feb. 27, 2009, which, in turn, is a continuation-in-part of Ser. No. 11/957,063, filed Dec. 14, 2007, now U.S. Pat. No. 7,569,767, issued Aug. 4, 2009, the entire contents of which are incorporated herein by reference.

FIELD OF THE INVENTION

The present invention relates to the field of communications, and, more particularly, to coaxial cables and associated methods for making the coaxial cables.

BACKGROUND OF THE INVENTION

Coaxial cables are widely used to carry high frequency electrical signals. Coaxial cables enjoy a relatively high bandwidth, low signal losses, are mechanically robust, and are relatively low cost. A coaxial cable typically includes an elongate inner conductor, a tubular outer conductor, and dielectric separating the inner and outer conductors. For example, the dielectric may be a plastic foam material. An outer insulating jacket may also be applied to surround the outer conductor.

One particularly advantageous use of coaxial cable is for connecting electronics at a cellular or wireless base station to an antenna mounted at the top of a nearby antenna tower. For example, the transmitter and receiver located in an equipment shelter may be coupled via coaxial cables to antennas carried by the antenna tower. A typical installation includes a relatively large diameter main coaxial cable extending between the equipment shelter and the top of the antenna tower to thereby reduce signal losses. For example, CommScope, Inc. of Hickory, N.C. offers its CellReach® coaxial cable for such applications.

In larger diameter coaxial cables, which are commonly used in cellular communication as described above, the elongate inner conductor can be tubular in shape. The tubular inner conductor may also surround an inner dielectric material. The inner conductor is typically manufactured by forming a flat layer or sheet of conductive material into a tube with a longitudinal seam and welding the seam to form a continuous joint. The outer conductor is also similarly manufactured by forming a flat layer or metal sheet into a tube with a longitudinal seam that is welded to form a continuous joint.

The high frequency currents carried by the coaxial cable are concentrated in only a small portion, radially outermost, of the inner conductor, and a correspondingly small radially innermost portion of the outer conductor. This characteristic is attributed to the electromagnetic phenomenon called the skin effect. Therefore, only the thin outer radial portion of the tubular inner conductor carries the high frequency currents. Conversely, the outer tubular conductor also carries the high frequency currents in the thin radially innermost portion.

Bimetallic layers have been used for the inner and/or outer tubular conductors in a coaxial cable where a higher conductivity and more expensive metal is used to provide the radially outermost portion of an inner conductor, and is used to provide the radially innermost portion of the outer conductor. For example, the outermost layer of the inner conductor may include a relatively costly and highly conductive metal such as copper, and the inner layer of the inner conductor may include a less costly and less conductive metal, such as aluminum. For example, U.S. Pat. No. 6,717,493 B2 to Chopra et al. and U.S. Patent Application No. 2004/0118591 A1 to Bufanda et al. each discloses a coaxial cable with such bimetallic tubular inner conductors.

Notwithstanding the benefits of a bimetal tubular inner conductor, there may be some shortcomings. For example, the manufacture of a bimetal tubular inner conductor usually involves some form of heat based welding, such as for example, conventional induction welding, to weld the seam to form a welded joint. Unfortunately, the two metals that form the bimetal tubular inner conductor usually have different melting temperatures. For example, copper and aluminum are commonly used as the outer and inner layers of the inner conductor, respectively. Copper has a melting point of 1100° C. and a conductivity of $59.6 \times 10^6$ S·m$^{-1}$, while aluminum has a lower melting point of 660° C. and a lower conductivity of $37.8 \times 10^6$ S·m$^{-1}$. This disparity in melting points makes welding of the joint relatively difficult.

In response to this particular shortcoming in manufacture of bimetal tubular inner conductors, coaxial cable manufacturers have developed a coaxial cable with a bimetal tubular inner conductor comprising an inlaid bimetallic layer, such as disclosed, for example, in U.S. Pat. No. 6,342,677 to Lee. This coaxial cable is more easily welded since only the inner metal layer is welded during manufacture of the bimetal tubular inner conductor. Nonetheless, the inlaid bimetal inner conductor is relatively costly to manufacture. Of course, similar considerations apply to the outer conductor of a coaxial cable. That is, a conventional bimetallic layer may be difficult to weld, and an inlaid bimetallic layer may be relatively expensive.

SUMMARY OF THE INVENTION

In view of the foregoing background, it is therefore an object of the present invention to provide a coaxial cable including an inner conductor fabricated using a less expensive tubular bimetallic layer that is also readily welded at its longitudinal seam.

This and other object, features, and advantages in accordance with the present invention are provided by a method for making a coaxial cable that may include an inner conductor, an outer conductor, and a dielectric material layer therebetween. The method may include forming the inner conductor by at least forming a bimetallic strip into a tubular bimetallic layer having a pair of longitudinal edge portions at a longitudinal seam, for example. The bimetallic strip may include an inner metal layer and an outer metal layer bonded thereto and coextensive therewith. Each of the longitudinal edge portions may be folded over. The method may also include forming a welded joint between adjacent portions of the folded over longitudinal edge portions and defining surplus material at the welded joint, for example. The method may further include removing the surplus material at the welded joint, and forming the dielectric material layer surrounding the inner conductor. The method may also include forming the outer conductor surrounding the dielectric material layer. Accordingly, a less expensive starting material may be used for the inner conductor, that is, for example, a simple bimetallic strip where both layers are coextensive, as compared to the more expensive inlaid bimetallic strip.

The outer metal layer may have a greater electrical conductivity than the inner metal layer. The inner metal layer may have a lower, melting temperature than the outer metal layer. For example, the inner metal layer may include aluminum, and the outer metal layer may include copper. The welded joint may be formed by high-frequency (HF) welding, for example.

The method may also include shaping each of the longitudinal edge portions. Shaping each of the longitudinal edge portions may include flattening the longitudinal edge portions at an interface therebetween, for example. Shaping may also include compressing each longitudinal edge portion. Additionally, the surplus material at the welded joint may be removed by skiving.

The tubular bimetallic layer may have a thickness in a range of about 0.005 to 0.050 inches. The outer metal layer may have a percentage thickness relative to an overall thickness of the tubular bimetallic layer in a range of about 1 to 30%, for example.

The method may further include forming another dielectric material layer filling the tubular bimetallic layer. The method may further include forming an insulating jacket surrounding the outer conductor, for example.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
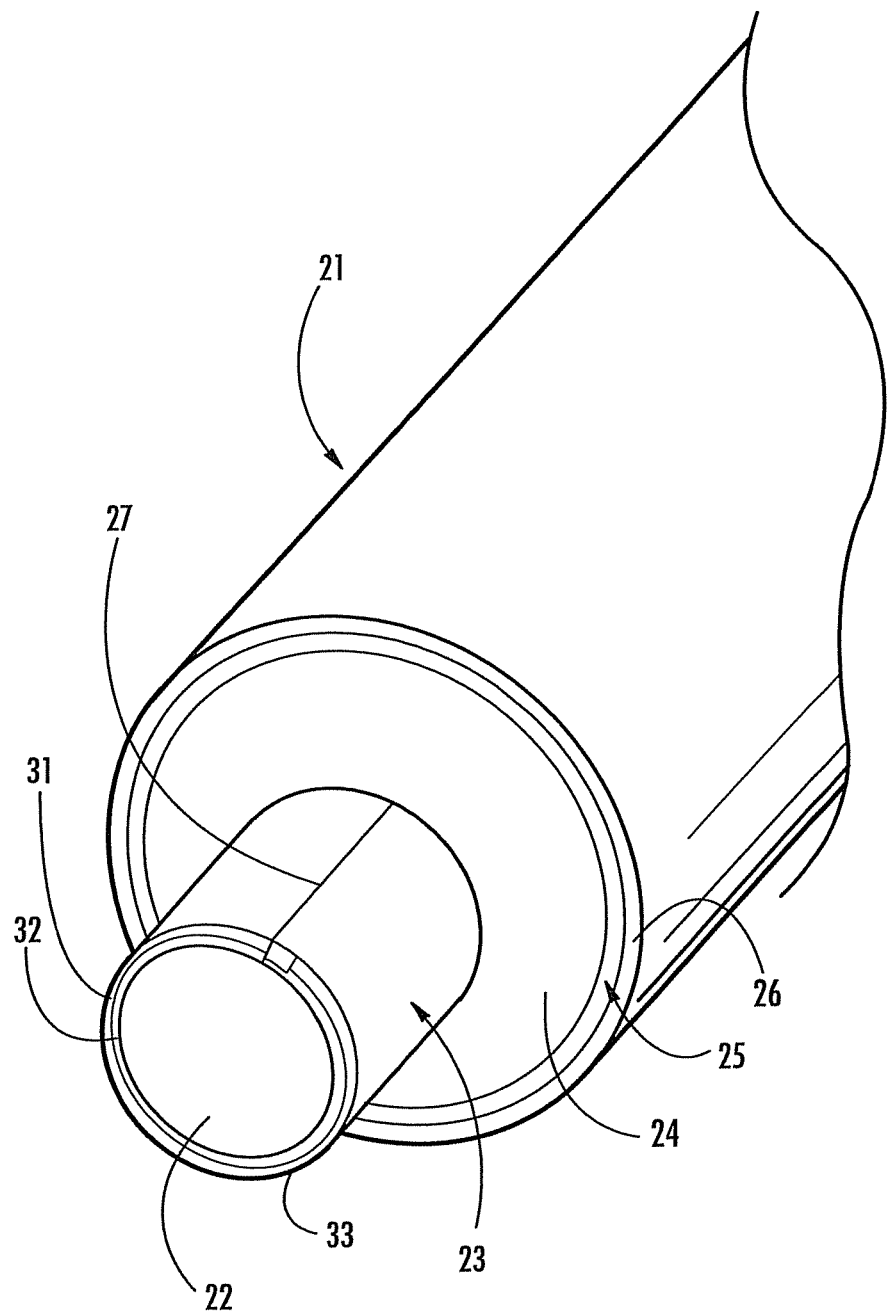
FIG. 1 is a perspective end view of a coaxial cable in accordance with the present invention.
Figure 2:
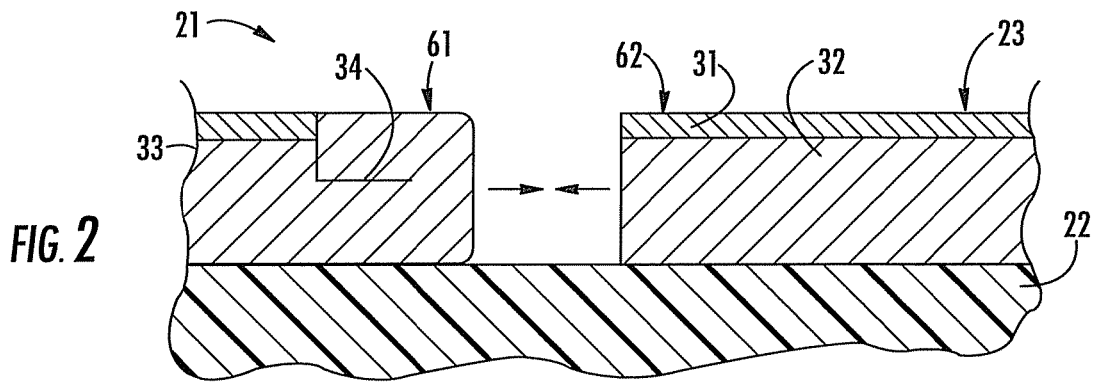
FIG. 2 is an enlarged cross-sectional view of a portion of the tubular bimetallic inner conductor of the coaxial cable of FIG. 1 shown prior to welding.
Figure 3:
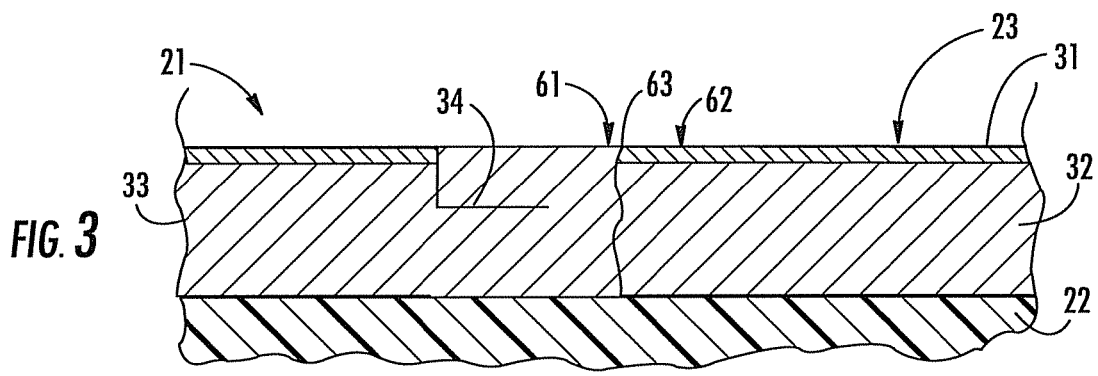
FIG. 3 is an enlarged cross-sectional view of the portion of the tubular bimetallic inner conductor of the coaxial cable of FIG. 1 shown after welding.

Referring initially to FIGS. 1-3, a coaxial cable 21 in accordance with the present invention is described. The coaxial cable 21 illustratively includes an inner conductor 23, an outer conductor 25, and a dielectric material layer 24 between the inner and outer conductors. The inner conductor 23 illustratively includes a tubular bimetallic layer 33 having a pair of opposing longitudinal edge portions at a longitudinal seam 27. The tubular bimetallic layer 33 illustratively includes an inner metal layer 32 and an outer metal layer 31 bonded thereto.

The tubular bimetallic layer 33 illustratively includes one of the opposing longitudinal edge portions comprising an end portion 61 of the inner metal layer 32 extending outwardly beyond the outer metal layer 31 and being folded over onto itself adjacent the outer metal layer and defining a non-joined interface 34 therewith.

The outer metal layer 31 may have a higher electrical conductivity than the inner metal layer 32 to facilitate signal carrying ability at the skin depth, for example. The inner metal layer 32 may have a lower melting temperature and a lower cost than the outer metal layer 31. The lower melting temperature of the inner metal layer 32 facilitates welding, for example. The inner metal layer 32 may comprise aluminum or any suitable metal as appreciated by a person skilled in the art, and the outer metal layer 31 may comprise copper or any suitable metal as appreciated by those skilled in the art.

The tubular bimetallic layer 33 may have a thickness in a range of about 0.005 to 0.050 inches, and the outer metal layer 31 may have a percentage thickness relative to an overall thickness of the tubular bimetallic layer 33 in a range of about 1 to 30%.

As shown perhaps best in FIG. 3, the longitudinal seam 27 illustratively includes a welded joint 63 between at least portions of the inner metal layer 32. The coaxial cable 21 illustratively comprises another dielectric material layer 22 filling the tubular bimetallic layer 33 and an insulating jacket 26 surrounding the outer conductor 25. Of course, welding may cause at least some portion of the non-joined interface 34 to become joined as will be appreciated by those skilled in the art.

Figure 4:
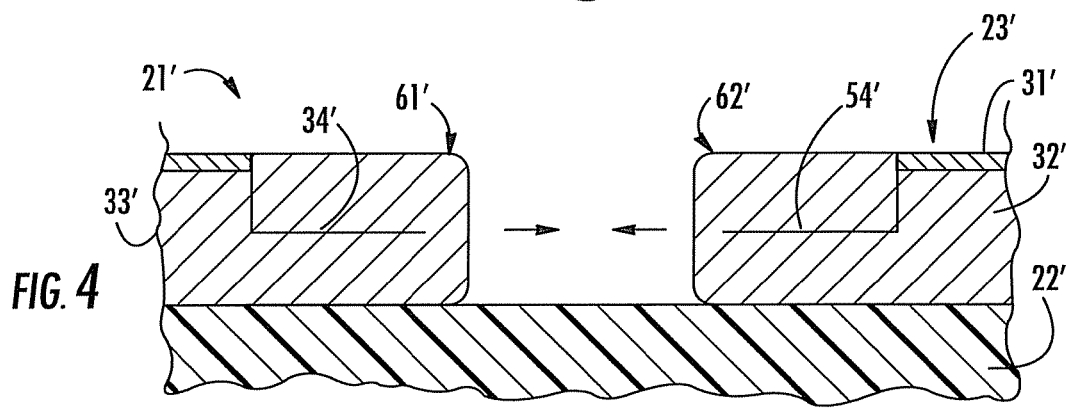
FIG. 4 is an enlarged cross-sectional view of a portion of a tubular bimetallic inner conductor of a coaxial cable of another embodiment shown prior to welding.
Figure 5:
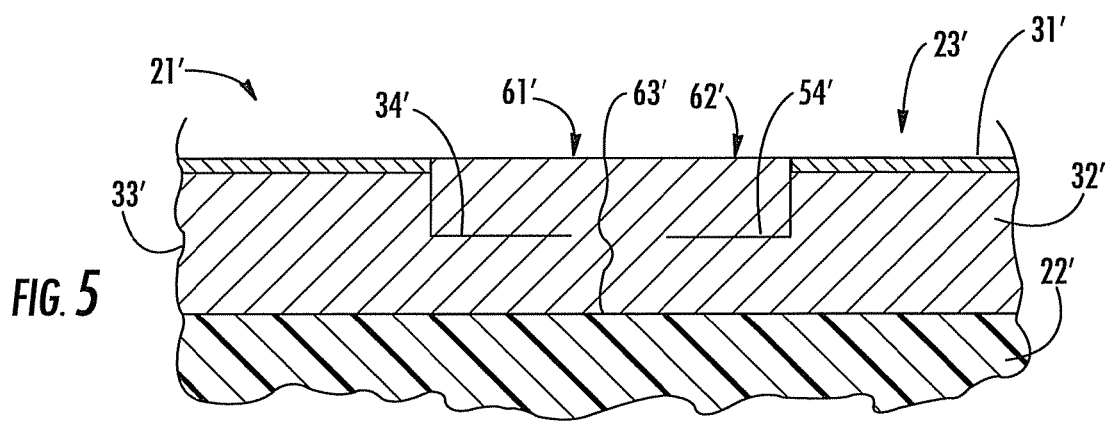
FIG. 5 is an enlarged cross-sectional view of the portion of the tubular bimetallic inner conductor of FIG. 4 shown after welding.

Referring now additionally to FIGS. 4-5, another embodiment is now described. In this embodiment of the coaxial cable 21', those elements already discussed above with respect to FIGS. 1-3 are given prime notation and most require no further discussion herein. This embodiment differs from the previous embodiment in that both of the opposing longitudinal edge portions illustratively include end portions 61', 62' of the inner metal layer 32' extending outwardly beyond the outer metal layer 31' and being folded over onto themselves adjacent the outer metal layer and defining non-joined interfaces 34', 54' therewith. Of course, welding may cause at least some portions of the non-joined interfaces 34', 54' to become joined as will be appreciated by those skilled in the art.

Figure 6:
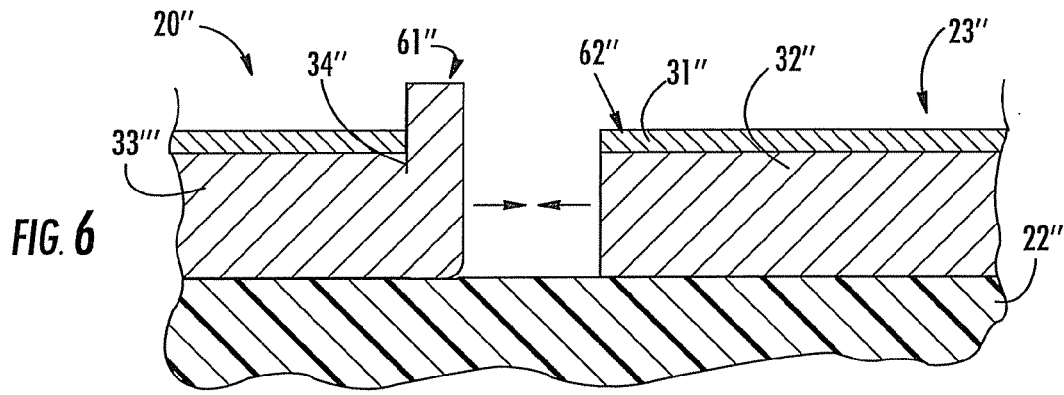
FIG. 6 is an enlarged cross-sectional view of a portion of a tubular bimetallic inner conductor of a coaxial cable of another embodiment shown prior to welding.
Figure 7:
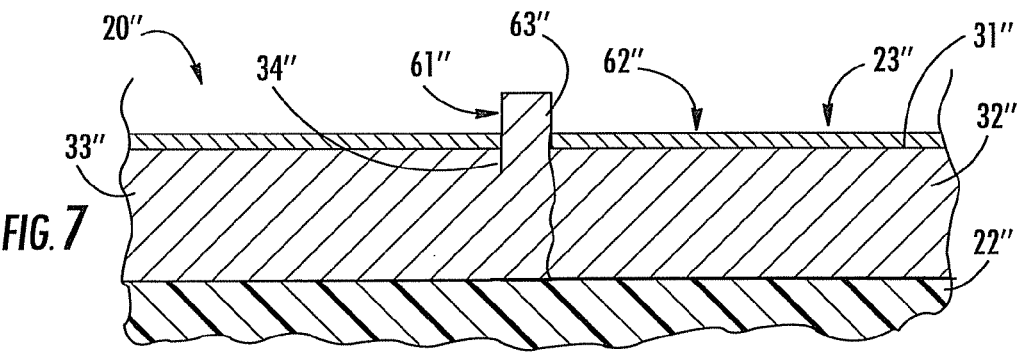
FIG. 7 is an enlarged cross-sectional view of the portion of the tubular bimetallic inner conductor of FIG. 6 shown after welding.

Referring now additionally to FIGS. 6-7, another embodiment is now described. In this embodiment of the coaxial cable 21", those elements already discussed above with respect to FIGS. 1-3 are given double prime notation and most require no further discussion herein. This embodiment differs from the previous embodiment in that the opposing longitudinal edge portions illustratively include one end portion 61" of the inner metal layer 32" extending outwardly beyond the outer metal layer 31" and being folded at a right angle adjacent the outer metal layer and defining a non-joined interface 34" therewith. After welding, as shown perhaps best in FIG. 7, a welded joint 63" is formed between the adjacent portions of the inner metal layer 32".

Figure 8:
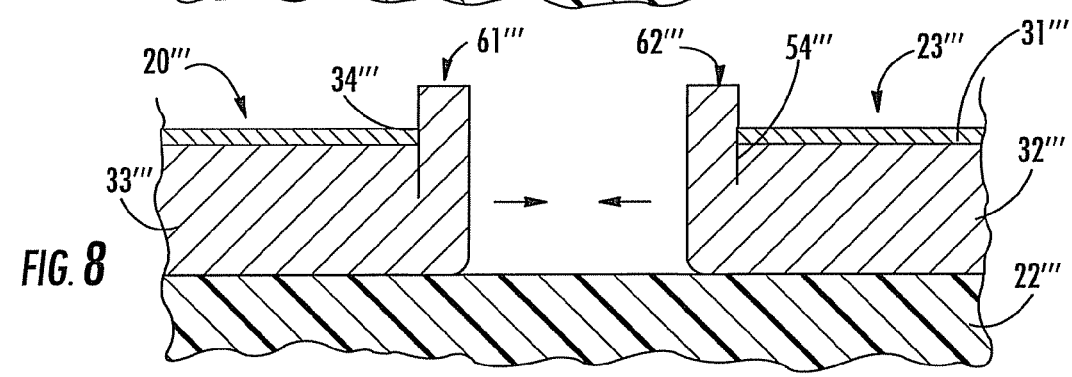
FIG. 8 is an enlarged cross-sectional view of a portion of a tubular bimetallic inner conductor of a coaxial cable of yet another embodiment shown prior to welding.
Figure 9:
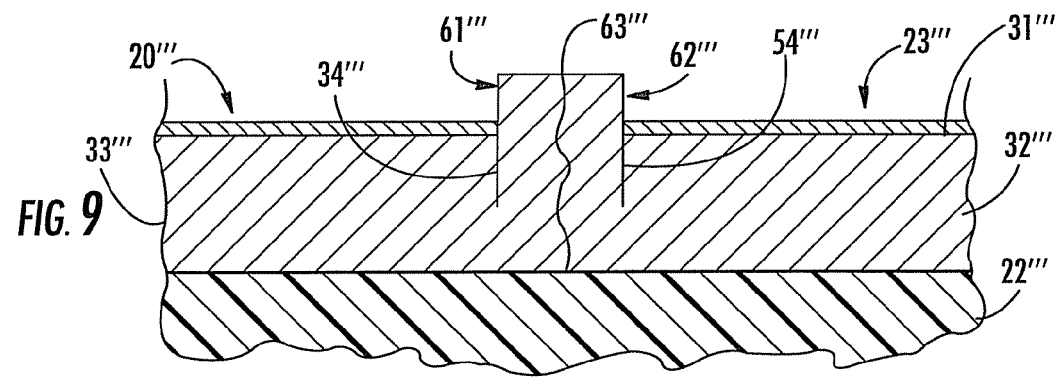
FIG. 9 is an enlarged cross-sectional view of the portion of the tubular bimetallic inner conductor of FIG. 8 shown after welding.

Referring now additionally to FIGS. 8-9, another embodiment is now described. In this embodiment of the coaxial cable 21''', those elements already discussed above with respect to FIGS. 6-7 are given triple prime notation and most require no further discussion herein. This embodiment differs from the previous embodiment in that each of the opposing longitudinal edge portions illustratively includes an end portion 61''', 62''' of the inner metal layer 32''' extending outwardly beyond the outer metal layer 31''' and being folded at a right angle adjacent the outer metal layer and defining a non-joined interface 34''', 54''' therewith.

Figure 10:
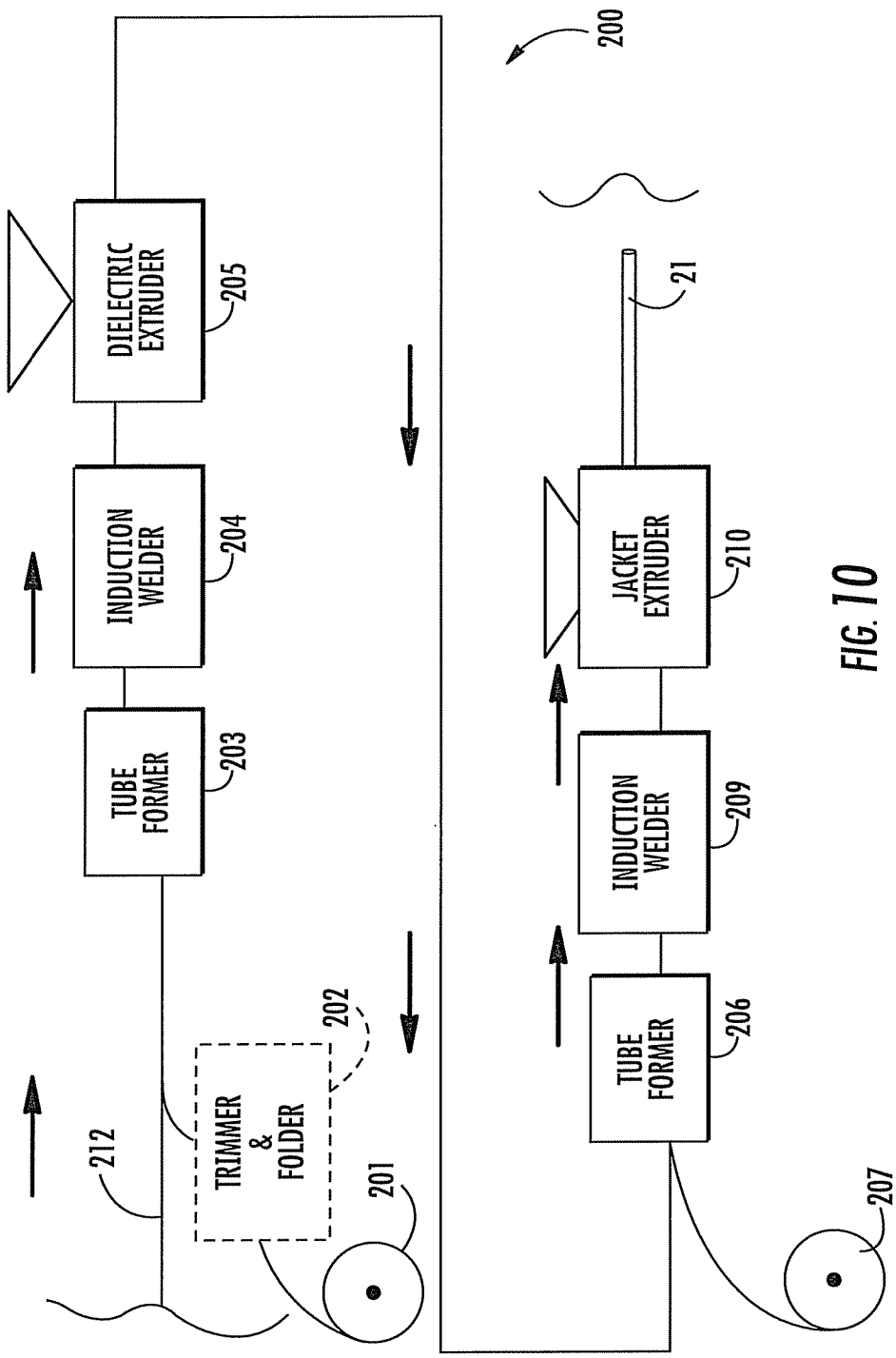
FIG. 10 is a schematic diagram of an apparatus for making a coaxial cable in accordance with the present invention.
Figure 11:
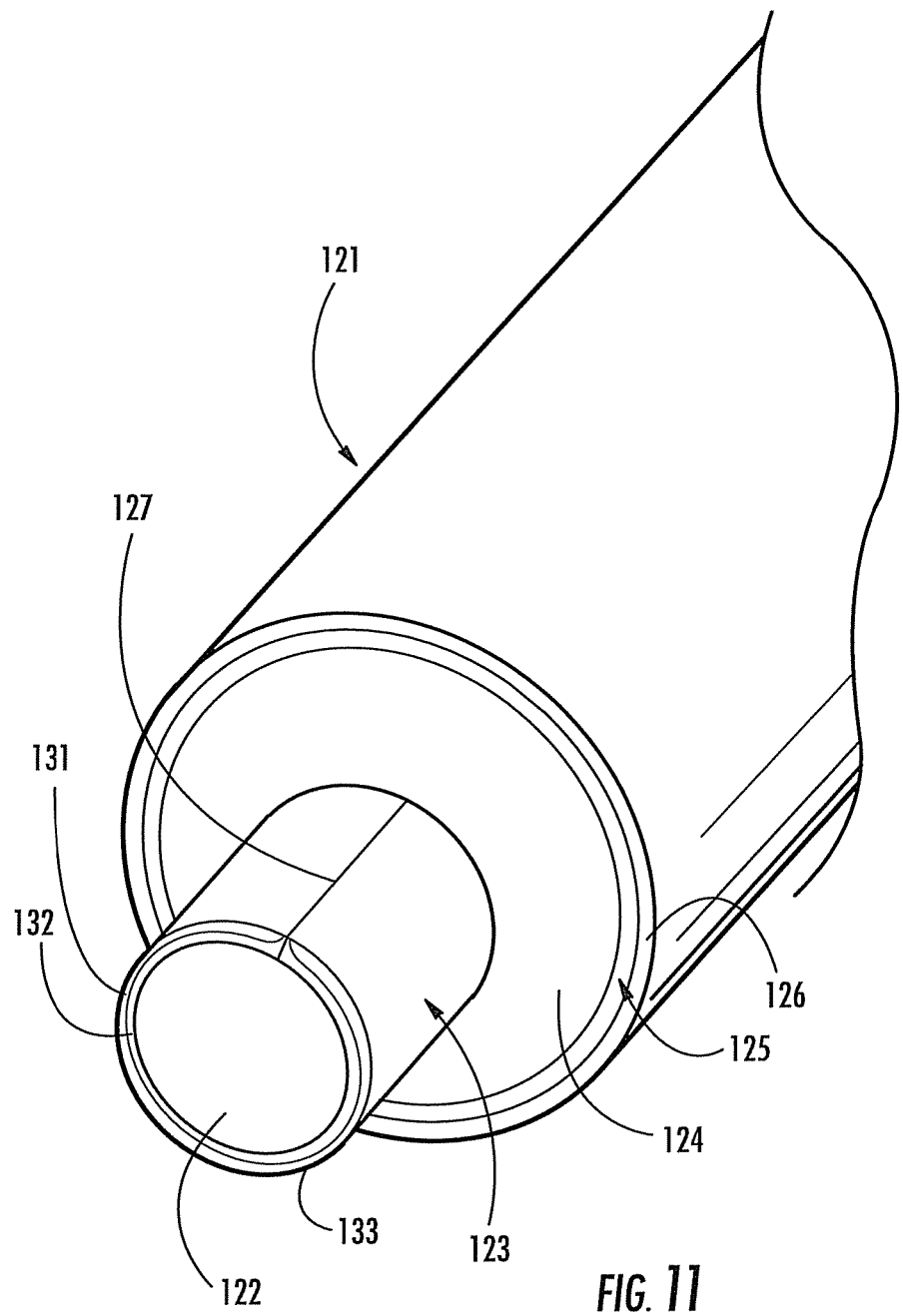
FIG. 11 is a perspective end view of a coaxial cable in accordance with another embodiment of the present invention.
Figure 12:
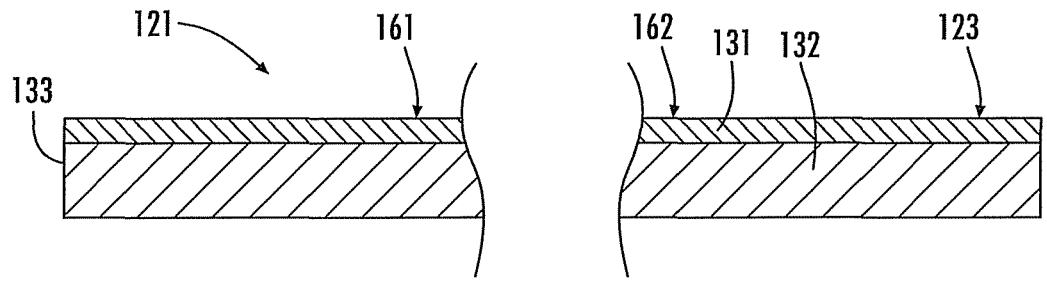
FIG. 12 is an enlarged cross-sectional view of a portion of the tubular bimetallic inner conductor of the coaxial cable of FIG. 11 shown prior to folding.

Referring additionally to FIG. 10, another aspect relates to a method and associated apparatus 200 for making a coaxial cable 21 that may comprise the inner conductor 23 including tubular bimetallic layer 33, outer conductor 25, and dielectric material layer 24 therebetween. A dielectric material rod 212 and a supply reel 201 of the bimetallic strip with a pair of longitudinal edge portions are provided. The bimetallic strip may comprise an inner metal layer and an outer metal layer bonded thereto. The supply reel 201 of the bimetallic strip may be provided with at least one of the longitudinal edge portions with an end portion of the inner metal layer extending outwardly beyond the outer metal layer. Further, the supply reel 201 of the bimetallic strip may also be provided comprising the end portion folded over onto itself adjacent the outer metal layer and defining a non-joined interface therewith.

In the alternative, the supply reel 201 of the bimetallic strip may be fed into a trimmer/folder 202, shown with dashed lines, which illustratively trims at least one of the longitudinal edge portions to provide an end portion of the inner metal layer extending outwardly beyond the outer metal layer. The trimmer/folder 202 may trim the metal layer using a diamond or other blade, or any other trimming techniques as will be appreciated by those skilled in the art. Further, the trimmer/folder 202 illustratively folds the end portion over onto itself adjacent the outer metal layer and defining a non-joined interface therewith.

Further and as discussed above, the outer metal layer may have a higher electrical conductivity than the inner metal layer. The inner metal layer may have a lower melting temperature than the outer metal layer. The inner metal layer may comprise aluminum or any suitable metal as appreciated by a person skilled in the art, and the outer metal layer may comprise copper or any suitable metal as appreciated by a person skilled in the art. The tubular bimetallic layer may have a thickness in a range of about 0.005 to 0.050 inches, and the outer metal layer may have a percentage thickness relative to an overall thickness of the tubular bimetallic layer in a range of about 1 to 30%.

The dielectric material rod 212 and the supply reel 201 of the bimetallic strip are fed into the tube former 203, which illustratively forms the bimetallic strip into a tubular bimetallic layer having a pair of opposing longitudinal edge portions at a longitudinal seam to provide the inner conductor comprising a tubular bimetallic layer.

As will be appreciated by those skilled in the art, the dielectric material may be disposed inside the inner tube downstream from the tube former 203, or thereafter using settable material as described in U.S. Pat. No. 6,915,564. The output of the tube former 203 is then fed into the induction welder 204, which illustratively welds the longitudinal seam to form a welded joint between at least portions of the inner metal layer. The output of the induction welder 204 is then fed into the dielectric extruder 205, which illustratively forms the dielectric material layer surrounding the inner conductor.

The output of the dielectric extruder 205 is then fed along with a supply reel 207 of the metallic strip into a second tube former 206, which illustratively forms the outer conductor surrounding the dielectric material layer.

The output of the second tube former 206 is fed into a second induction welder 209, which illustratively welds the outer conductor. The output of the second induction welder 209 is fed into the jacket extruder 210, which forms an insulating jacket surrounding the outer conductor. The completed coaxial cable 21 is output from the jacket extruder 210 for take-up by a suitable take-up reel, not shown.

In other embodiments, the supply reel 201 of the bimetallic strip may be provided with at least one of the longitudinal edge portions with an end portion of the inner metal layer extending outwardly beyond the outer metal layer. Further, the supply reel 201 of the bimetallic strip may be provided comprising the end portion folded at a right angle adjacent the outer metal layer and defining a non-joined interface therewith.

Referring now additionally to FIGS. 11-21 with reference to flow chart 300, another aspect is related to a method for making a coaxial cable 121 that may include an inner conductor 123, an outer conductor 125 and a dielectric material layer 124 therebetween. Starting at Block 302, the method includes forming the inner conductor 123 by at least forming a bimetallic strip into a tubular bimetallic layer 133 having a pair of longitudinal edge portions 161, 162 at a longitudinal seam 127. The tubular bimetallic strip includes an inner metal layer 132 and an outer metal layer 131 that is bonded to the inner metal layer and coextensive therewith. The coextensive inner and outer metal layers 132, 131 advantageously overcome shortcomings of a copper-inlay material, as the coextensive bimetallic strip is more readily available and has a reduced cost as compared to the copper inlay. Additionally, while the coaxial cable 121 includes smooth-well inner and outer conductors 123, 125, it will be appreciated by those skilled in the art that the inner and outer conductors may be corrugated.

Figure 17:
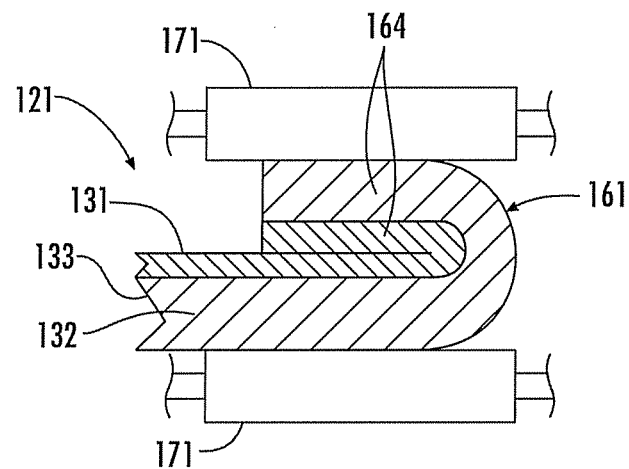
FIG. 17 is an enlarged cross-sectional view of a portion of the tubular bimetallic inner conductor of the coaxial cable of FIG. 11 being shaped.
Figure 18:
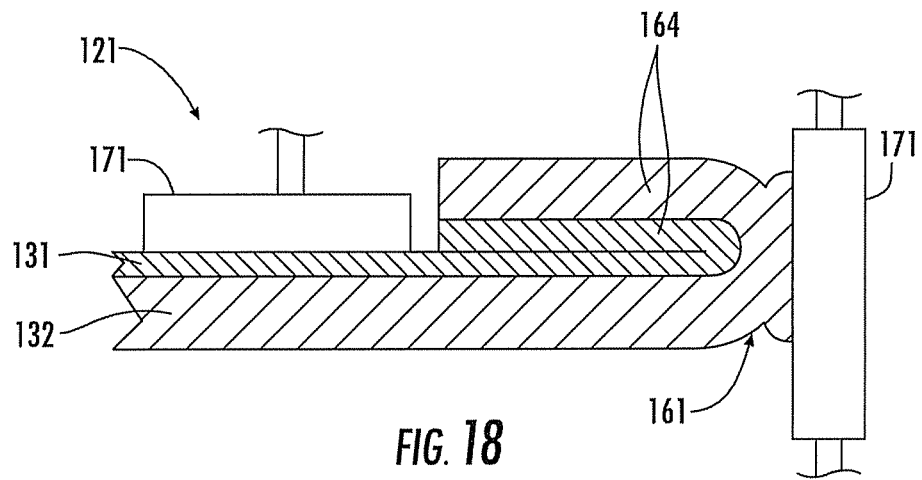
FIG. 18 is another enlarged cross-sectional view of a portion of the tubular bimetallic inner conductor of the coaxial cable of FIG. 11 being further shaped.

Illustratively, each of the longitudinal edge portions 161, 162 is folded over (Block 304). Each of the folded longitudinal edge portions 161, 162 may be shaped, for example, compressed by progressive roll forming. For example, flat rolls 171, may be used around the folded longitudinal edge portions 161, 162 to form a bend of about 180 degrees, as illustrated in FIG. 17 (Block 306). Each of the longitudinal edge portions 161, 162 may also be flattened by flat rolls 171 at an interface therebetween to further define each folded longitudinal edge portion, as illustrated in FIG. 18, for example.

Figure 13:
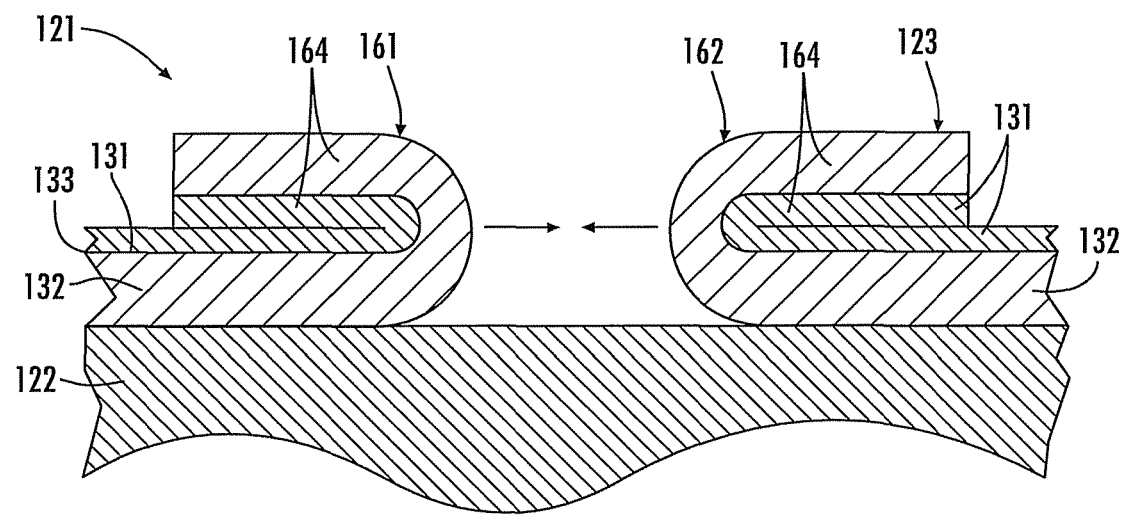
FIG. 13 is an enlarged cross-sectional view of the portion of the tubular bimetallic inner conductor of the coaxial cable of FIG. 11 shown prior to shaping.
Figure 14:
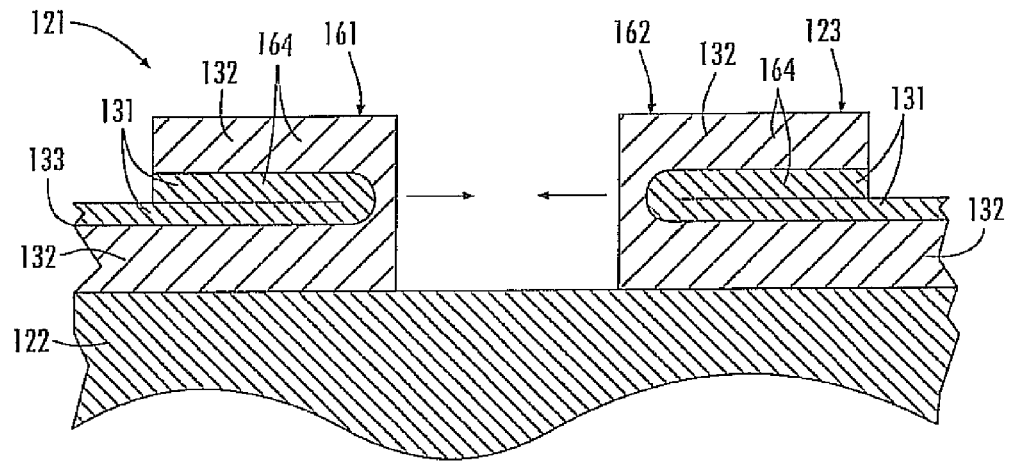
FIG. 14 is another enlarged cross-sectional view of the portion of the tubular bimetallic inner conductor of the coaxial cable of FIG. 11 shown prior to welding.
Figure 19:
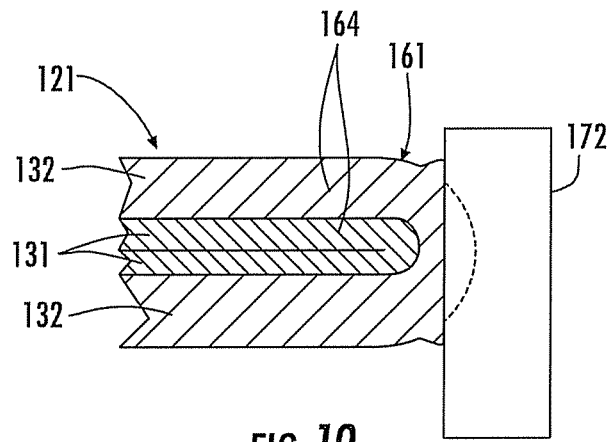
FIG. 19 is an enlarged cross-sectional view of a portion of the tubular bimetallic inner conductor of the coaxial cable of FIG. 11 having a longitudinal edge portion skived.
Figure 20:
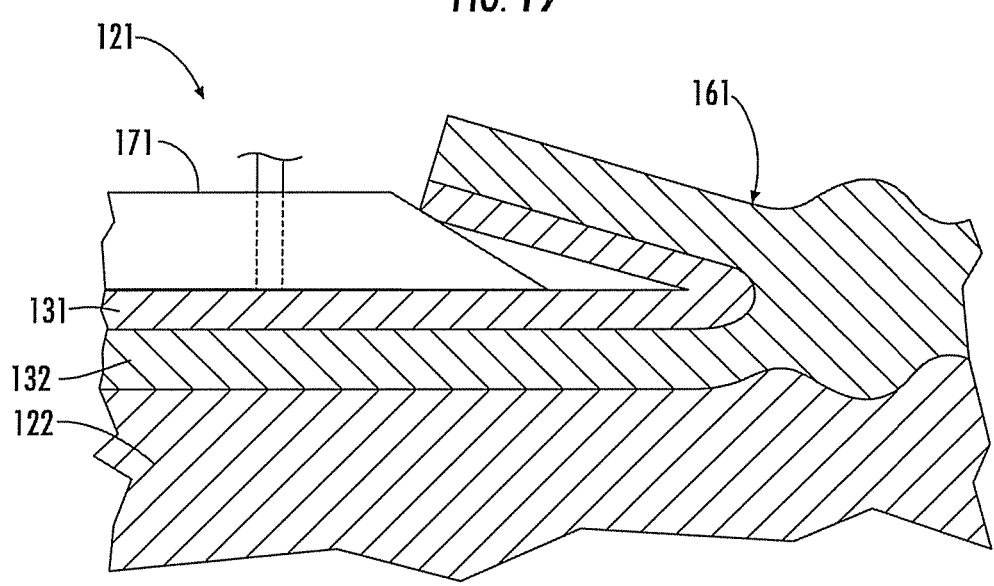
FIG. 20 is an enlarged cross-sectional view of a portion of the tubular bimetallic inner conductor of the coaxial cable of FIG. 11 having the surplus material being roll lifted.
Figure 21:
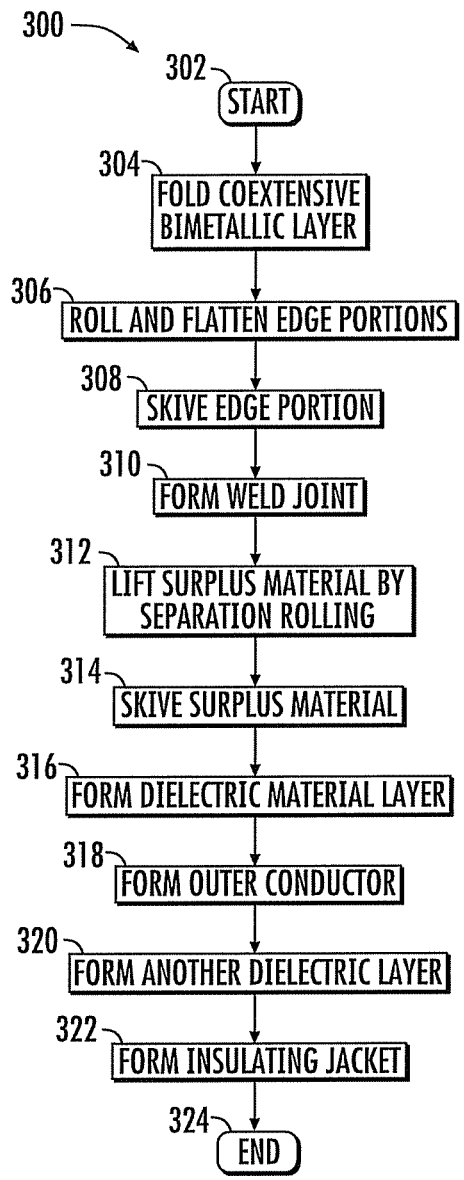
FIG. 21 is a flow chart of a method of making the coaxial cable of FIG. 11.

As illustrated in FIG. 13, for example, opposing folded longitudinal edge portions 161, 162 may be rounded from the folding over. Each of the folded longitudinal edge portions 161, 162 may be shaped by skiving (Block 308) opposing ends of each of the longitudinal edge portions, as illustrated in FIG. 19. Skiving each folded longitudinal edge portion 161, 162 advantageously may flatten, by removing rounded portions of each opposing folded longitudinal edge portion, as illustrated perhaps best in FIG. 14. Skiving may be performed using a diamond, carbide, or ceramic knife 172, for example, and may be performed water-cooled or dry. Other skiving methods may be performed, as will be appreciated by those skilled in the art.

Figure 15:
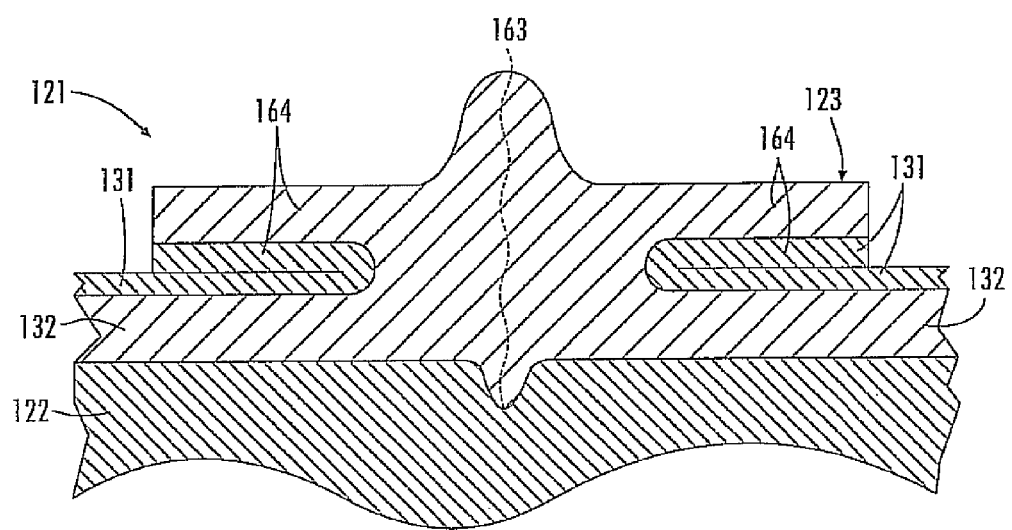
FIG. 15 is an enlarged cross-sectional view of the portion of a tubular bimetallic inner conductor of a coaxial cable of FIG. 11 shown after welding.

As illustrated, perhaps best in FIG. 15, a welded joint 163 is formed (Block 310) between adjacent portions of the folded over longitudinal edge portions 161, 162. The welded joint 163 may be formed by a high frequency weld, or other suitable welding technique, as will be appreciated by those skilled in the art.

The welded joint 163 and the folded over longitudinal edge portions 161, 162 define surplus material 164 at the welded joint. The surplus material 164 is removed at the welded joint 163. The surplus material 164 may be lifted by separation rolls 171 (Block 312) and removed by a skiving knife (Block 314) or a scarf knife, for example, as illustrated more particularly in FIG. 20. Other surplus material 164 removal tools may be used, as will be appreciated by those skilled in the art.

Figure 16:
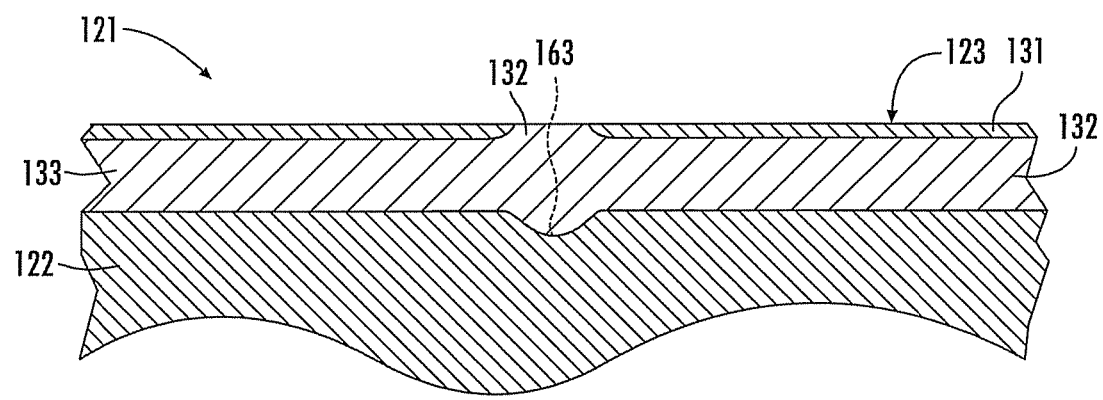
FIG. 16 is an enlarged cross-sectional view of the portion of the tubular bimetallic inner conductor of the coaxial cable of FIG. 11 shown after the surplus material removal.

After the surplus material 164 is removed, as illustrated in FIG. 16, the inner metal layer 132 is exposed at the weld joint 163. The amount of exposure of the inner metal layer 132 is controllable, and may be no wider than twice the thickness of the original bimetallic strip. However, other widths of inner metal layer 132 exposure may be contemplated by those skilled in the art.

The method further includes forming the dielectric material layer 124 (Block 316) surrounding the inner conductor 123. The method also includes forming the outer conductor 125 (Block 318) surrounding the dielectric material layer 124. Another dielectric material layer 122 may be formed (Block 320) filling the tubular bimetallic layer 133. Also, an insulating jacket 126 surrounding the outer conductor 125 may be formed at Block 322 before finishing at Block 324.

Further and as discussed above, the outer metal layer 131 may have a higher electrical conductivity than the inner metal layer 132. The inner metal layer 131 may have a lower melting temperature than the outer metal layer 131. The inner metal layer 132 may comprise aluminum or any suitable metal as appreciated by a person skilled in the art, and the outer metal layer 131 may comprise copper or any suitable metal as appreciated by a person skilled in the art. The tubular bimetallic layer 133 may have a thickness in a range of about 0.005 to 0.050 inches; and the outer metal layer 131 may have a percentage thickness relative to an overall thickness of the tubular bimetallic layer in a range of about 1 to 30%.

This application is related to copending patent applications entitled, COAXIAL CABLE INCLUDING TUBULAR BIMETALLIC INNER LAYER WITH BEVELLED EDGE JOINT AND ASSOCIATED METHODS, U.S. application Ser. No. 11/957,020; COAXIAL CABLE INCLUDING TUBULAR BIMETALLIC INNER LAYER WITH ANGLED EDGES AND ASSOCIATED METHODS, U.S. application Ser. No. 11/957,042; COAXIAL CABLE INCLUDING TUBULAR BIMETALLIC OUTER LAYER WITH BEVELLED EDGE JOINT AND ASSOCIATED METHODS, U.S. application Ser. No. 11/957,070; COAXIAL CABLE INCLUDING TUBULAR BIMETALLIC OUTER LAYER WITH ANGLED EDGES AND ASSOCIATED METHODS, U.S. application Ser. No. 11/957,089; and COAXIAL CABLE INCLUDING TUBULAR BIMETALLIC OUTER LAYER WITH FOLDED EDGE PORTIONS AND ASSOCIATED METHODS, U.S. application Ser. No. 11/957,100, the entire disclosures of which are hereby incorporated by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method for making a coaxial cable comprising an inner conductor and an outer conductor spaced from the inner conductor, the method comprising:
   forming the inner conductor by at least
      forming a bimetallic strip into a tubular bimetallic layer having a pair of longitudinal edge portions at a longitudinal seam and comprising an inner metal layer and an outer metal layer bonded thereto, each of the longitudinal edge portions being folded,
      forming a welded joint between adjacent portions of the folded longitudinal edge portions and defining surplus material at the welded joint, and
   removing the surplus material at the welded joint; and
   forming the outer conductor spaced from the inner conductor.

2. The method according to claim 1 wherein the outer metal layer has a greater electrical conductivity than the inner metal layer.

3. The method according to claim 1 wherein the inner metal layer has a lower melting temperature than the outer metal layer.

4. The method according to claim 1 wherein the inner metal layer comprises aluminum; and wherein the outer metal layer comprises copper.

5. The method according to claim 1 further comprising shaping each of the longitudinal edge portions.

6. The method according to claim 5 wherein shaping comprises compressing each longitudinal edge portion.

7. The method according to claim 5 wherein shaping each of the longitudinal edge portions comprises flattening the longitudinal edge portions at an interface therebetween.

8. The method according to claim 1 wherein removing the surplus material at the welded joint comprises skiving.

9. The method according to claim 1 wherein the tubular bimetallic layer has a thickness in a range of about 0.005 to 0.050 inches.

10. The method according to claim 1 wherein the outer metal layer has a percentage thickness relative to an overall thickness of the tubular bimetallic layer in a range of about 1 to 30%.

11. The method according to claim 1 further comprising forming a dielectric material layer filling the tubular bimetallic layer.

12. The method according to claim 1 further comprising forming an insulating jacket surrounding the outer conductor.

13. The method according to claim 1 wherein the inner metal layer is coextensive with the outer metal layer.

14. A method for making a coaxial cable comprising an inner conductor, and an outer conductor spaced from the inner conductor, the method comprising:
    forming the inner conductor by at least
        forming a bimetallic strip into a tubular bimetallic layer having a pair of longitudinal edge portions at a longitudinal seam and comprising an inner metal layer and an outer metal layer bonded thereto, each of the longitudinal edge portions being folded,
        shaping each of the folded longitudinal edge portions,
        forming a welded joint between adjacent portions of the shaped folded longitudinal edge portions and defining surplus material at the welded joint, and
    skiving the surplus material at the welded joint; and
    forming the outer conductor spaced from the inner conductor.

15. The method according to claim 14 wherein the outer metal layer has a greater electrical conductivity than the inner metal layer.

16. The method according to claim 14 wherein the inner metal layer has a lower melting temperature than the outer metal layer.

17. The method according to claim 14 wherein the inner metal layer comprises aluminum; and wherein the outer metal layer comprises copper.

18. The method according to claim 14 wherein the inner metal layer is coextensive with the outer metal layer.

19. A method for making a coaxial cable comprising an inner conductor, and an outer conductor spaced from the inner conductor, the method comprising:
    forming the inner conductor by at least
        forming a bimetallic strip into a tubular bimetallic layer having a pair of longitudinal edge portions at a longitudinal seam and comprising an inner metal layer and an outer metal layer bonded thereto, each of the longitudinal edge portions being folded,
        forming a welded joint between adjacent portions of the folded longitudinal edge portions and defining surplus material at the welded joint, and
    removing the surplus material at the welded joint;
    forming the outer conductor spaced from the inner conductor;
    forming a dielectric material layer filling the tubular bimetallic layer; and
    forming an insulating jacket surrounding the outer conductor.

20. The method according to claim 19 further comprising shaping each of the longitudinal edge portions.

21. The method according to claim 20 wherein shaping comprises compressing each longitudinal edge portion.

22. The method according to claim 20 wherein shaping each of the longitudinal edge portions comprises flattening the longitudinal edge portions at an interface therebetween.

23. The method according to claim 19 wherein the inner metal layer is coextensive with the outer metal layer.

* * * * *